3,326,997
PROCESS FOR THE PRODUCTION OF DURENE
Patrick W. Ryan, Chicago Heights, La Vern H. Beckberger, Harvey, and Robert M. Eichhorn, Chicago Heights, Ill., assignors to Sinclair Research, Inc., New York, N.Y., a corporation of Delaware
Filed June 1, 1964, Ser. No. 371,501
8 Claims. (Cl. 260—672)

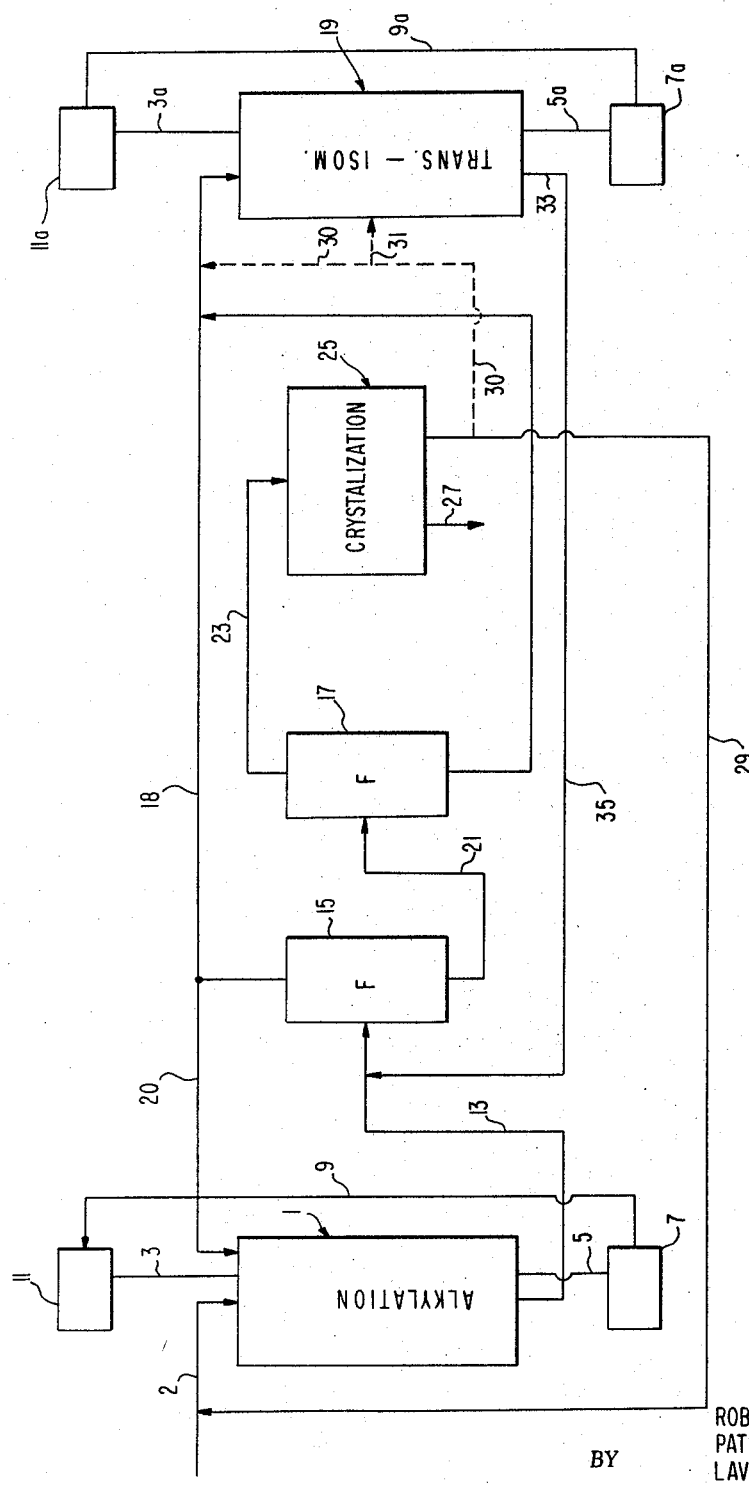

The present invention relates to a process for the production of durene by the methylation and transalkylation-isomerization of aromatic hydrocarbons using certain catalyst systems.

Production of alkylated aromatics such as durene by the alkylation of aromatics employing a fixed bed of catalyst followed by the transalkylation-isomerization of intermediate alkylate employing a fixed bed of catalyst is known to the art as illustrated by U.S. Patent No. 2,756,261 to Fetterly et al. There are, however, certain disadvantages associated with such systems. For example, in the alkylation reaction, coke formation readily occurs due to decomposition of the alkylating agent, e.g. methanol, and aromatics. The coke formed in this manner rapidly deactivates the catalyst thereby limiting the length of the processing cycle in a fixed bed reactor. Because of the rapid coke formation various methods are employed to reduce the rate of alkylating agent decomposition. Among these methods are the use of (1) elevated pressures, (2) hydrogen, and (3) highly selective catalysts. These methods all require large capital expenditures and result in high operating costs, yet it is still often necessary to provide swing reactors for the alkylation reaction because of the coke build-up. A "swing" reactor is one adapted to replace a reactor on stream to provide for continuous processing while catalyst in the latter is regenerated.

Undue side reactions also occur in the fixed-bed transalkylation-isomerization. The side reactions that occur here are demethylation via the "paring" reaction or hydrogenolysis and coke formation. In view of the coke build-up catalyst activity cannot be maintained and an attempt to maintain activity by raising the reaction temperatures results in a loss in isomerization selectivity. Thus, in the fixed bed transalkylation-isomerization reaction method, as in the alkylation "swing" reactors operation, frequent catalyst regenerations are necessary.

The process of the present invention obviates or alleviates the aforementioned disadvantages and possesses greater overall flexibility than known prior art processes. It has been found, for example, that the process of the invention:

(1) Maintains high catalyst activity in both the alkylation and transalkylation-isomerization reactions without raising temperatures or employing hydrogen or other diluents;

(2) eliminates the need for swing reactors;
(3) provides good overall yields of the desired methylated aromatic;
(4) reduces side reactions in both reactors; and
(5) maintains a high isomerization selectivity to the aromatic of desired carbon content in the transalkylation-isomerization reaction.

In accordance with the process of the present invention, an aromatic hydrocarbon feed consisting essentially of methylbenzenes having 2 to 3 methyl substituents is contacted with a moving bed of acidic, silica-based alkylation catalyst and a condensation methylating agent under methylating conditions including a temperature of about 550 to 850° F., preferably 600 to 800° F. The resulting effluent is fractionated to obtain a $C_{10}$ methylated aromatic hydrocarbon fraction and methylated benzenes of greater and lesser carbon atom content than the $C_{10}$ aromatic fraction. We return about 70% to 99% by weight, preferably 70 to 95% of the methylated benzenes of lesser carbon atom content from said fractionation to said alkylation, i.e. methylation, and separate durene from said $C_{10}$ average fraction by crystallization. At least about 1, preferably about 5 to 30% by weight of the methylated benzenes of lesser carbon atoms from said fractionation, and the methylated benzenes of greater carbon atoms as a combined methyl benzene feedstock of about 9.5 to 10.5 carbon atoms average, is contacted with a moving bed of acidic, silica-based alkylation catalyst under transalkylation-isomerization conditions including a temperature of about 550 to 700° F. Additional durene is removed from the resulting effluent, e.g. by passing it to the fractionation-crystallization system handling the alkylation effluent.

In the process of the invention the $C_9$ minus fraction of the alkylation reaction effluent is split with at least about 70% being returned to the alkylation and a sufficient amount of the remaining portion, i.e. at least about 1% of the $C_9$ minus fraction, is passed to the transalkylation-isomerization reactor to provide a feedstock averaging about 9.5 to 10.5 carbon atoms. In this manner not only is a 9.5 to 10.5 average carbon atom feedstock to the transalkylation-isomerization reaction provided but a total hydrocarbon to methylating agent molar ratio of about 0.5 to 5 to 1 is maintained in the alkylation reaction. The actual amount of $C_9$ minus material returned to the alkylation will be that amount which along with the other hydrocarbons entering the alkylation provides in the alkylation reaction the total hydrocarbon to methylating agent molar ratio within about 0.5 to 5 to 1 desired. Often when operating at total hydrocarbon to methylating agent molar ratios of about 0.5 to 3, about 70 to 95% of the $C_9$ minus fraction can be returned to the alkylation while at molar ratios of greater than 3 up to 5, greater than 95% can be returned. In designating the aromatic to methylation agent molar ratio we refer to the number of methyl groups in the methylating agent i.e. one mole of methanol has one mole of methylating methyl group while one mole of dimethyl ether has two moles of methylating methyl group.

As modifications of the process of the present invention, the crystallization mother liquor can be fed to the alkylation reaction or the transalkylation-isomerization reaction. In another embodiment of the invention the crystallization mother liquor is passed to the isomerization zone of the transalkylation-isomerization system. In still another modification the alkylation and transalkylation-isomerization reactions can employ catalyst passing from one system to the other.

The catalyst in the moving beds of both the alkylation and the transalkylation-isomerization zones is in the form of macrosize particles, regular or irregular in shape and generally from about 1/16 to 1/2, preferably about 1/8 to 1/4, inch in diameter and, if not spherical in form, from about 1/16 to 1/4, preferably from about 1/8 to 1/4, inch in length. The catalyst is moved as a compact mass in a single general direction, such as from a catalyst inlet to an outlet, through the hydrocarbon conversion zone; and is usually circulated as a compact moving mass through successsive stages of hydrocarbon conversion and catalyst regeneration. Between the conversion and regeneration zones the catalyst may or may not be transported as a compact mass. The moving bed can be moved in any direction, for instance, upwardly or it can gravitate downwardly through a hydrocarbon conversion zone, either countercurrently or concurrently with the hydrocarbon material and with a minimum of backmixing between the hydrocarbon material and the catalyst. The hydrocarbon material essentially moves in one direction from feed inlet to product outlet. The moving bed procedure can be distinguished from a fluidized bed employing powdery catalytic material which does not move through a conversion zone as a compact mass and involves a considerable degree of backmixing between the catalyst and hydrocarbon material in the conversion zone.

The aromatic feedstock found suitable for the practice of the present invention are feeds consisting essentially of methylated benzenes containing 2 to 3 methyl substituents. The individual methyl benzenes, for instance, ortho, meta and para xylene; and the trimethylbenzenes such as 1,2,3-trimethylbenzene, 1,2,4-trimethylbenzene, 1,3,5-trimethylbenzene or mixtures of these methylbenzenes can be used. The feeds may contain say up to about 25% of benzenes substituted with alkyl groups of two or more carbon atoms, for example, ethylbenzenes, but preferably this amount is less than about 10%.

The methylating agents suitable for use in the present process are "condensation methylating agents" and include organic compounds containing at least one methyl radical which is transferable to the benzene nucleus. These compounds include methyl alcohol and dimethyl ether.

The process of the present invention will be more clearly understood by reference to the accompanying drawing which is a schematic diagram of the process.

Referring to the drawing, hot silica-based catalyst is continuously circulated as a compact mass through reactor 1. The catalyst is introduced by line 3 into the top of the catalyst bed in alkylation reactor 1 and gravitates downwardly through the reactor and is removed via line 5, at a rate sufficient to give the desired amount of carbon deposit on the catalyst. The removed catalyst can be conducted to and regenerated in regenerator 7, lifted by air lift 9 to separator surge 11 and reintroduced into line 3. Methylbenzene feed, e.g. xylene, and a methylating agent, e.g. methanol, are introduced into the top of alkylation reafflictor 1 by means of line 2. A $C_8$–$C_9$ methyl benzene stream enters the reactor by way of line 20 to give an aromatic to methylating agent ratio of about 0.5 to 5:1.

The alkylate product is withdrawn from the bottom of reactor 1, sent via line 13 to tower 15, the first tower of a two-tower heart cut fractionation system also including tower 17. The top stream from tower 15 containing $C_{8-9}$ methylbenzenes is split with part being sent to reactor 1 as described above and the other portion being conducted by line 18 to the top of transalkylation-isomerization reactor 19. The bottoms from tower 15 are conducted through line 21 to tower 17 where aromatics, for instance, $C_{11}$ and $C_{12}$ aromatics, heavier than the desired product durene, are removed and sent to the top of transalkylation-isomerization reactor 19. The overhead from tower 17 represents the heart or close cut fraction of the alkylate feed, i.e. is composed predominantly or even substantially entirely of components of ten carbon atoms. The overhead is passed through line 23 to crystallization unit 25 where durene is crystallized and recovered by line 27. Durene crystallization mother liquor can be removed and recycled by line 29 to line 2 and alkylation reactor 1.

Another embodiment of the present invention is shown by the dotted lines in the drawing. In this embodiment the durene crystallization mother liquor is sent to the top of the transalkylation-isomerization reactor by means of line 30 which connects with line 18 or to the mid-portion of the transalkylation-isomerization reactor through lines 30 and 31, respectively. The mid-portion of reactor 19 corresponds approximately to the beginning of the principle isomerization zone of the transalkylation-isomerization reactor. Effluent from transalkylation-isomerization reactor 19 is removed by means of line 33 and recycled by line 35 to the two-tower fractionation system (15 and 17).

The transalkylation-isomerization reactor 19 contains a moving bed of silica-based catalyst, introduced through line 3a which gravitates downwardly and is removed by line 5a. It can be regenerated in regenerator 7a and directed by air lift 9a to separator surge 11a.

The alkylation conditions in the alkylation reaction used in the method of the present invention include a temperature, as aforementioned, of about 550 to 850° F., preferably about 600 to 800° F. Higher temperatures in the indicated ranges are generally employed for lower carbon atom feeds while lower temperatures are used with higher carbon atom feeds. The reaction is conveniently conducted at atmospheric pressure but lower or higher pressures can be utilized if desired. The weight hourly space velocity employed is generally about 0.1 to 10, preferably, about 1 to 2 weights of aromatic per weight of catalyst per hour (WSHV). The aromatic feed to methylating agent molar ratio generally employed is about 0.5 to 10:1 preferably about 1 to 6:1. The catalyst holding time usually falls in the range of about 0.05 to 1, preferably about 0.1 to 0.5 hours.

In the transalkylation-isomerization zone 19 methyl benzenes are transalkylated toward methyl benzenes having the same number of carbon atoms as the desired product, i.e., about 10 carbon atoms, which in turn undergo isomerization. Some disproportionation of hydrocarbon material occurs during isomerization but because of the conditions existing in the reactor, the amount of disproportionation is controlled to produce an unexpectedly favorable overall reaction rate of the isomerization of the charge to desired product. The transalkylation-isomerization can be a single zone or can be separated if desired, into two zones, a transalkylation zone and an isomerization zone.

The transalkylation-isomerization conditions include temperatures of about 550 to 700° F., preferably 575 to 625° F. The weight hourly space velocity employed is generally about 0.5 to 10, preferably about 1 to 2, weights of aromatic per weight of catalyst per hour (WSHV). The catalyst holding time in hours usually falls in the range of about 0.1 to 3, preferably 0.1 to 1.

Catalysts which can be employed in accordance with the present invention include solid acidic materials. Although the surface area of the catalyst may be varied within wide limits, superior yields of durene are obtainable when the surface area of the catalyst is above 90 m.²/gm. The catalysts include synthetic gel-type catalysts, for instance those disclosed in U. S. Patents Nos. 2,384,505 and 2,542,190, hereby incorporated by reference, and clay catalysts. These catalysts are acidic, solid, mixed oxide hydrocarbon cracking catalysts, advantageously we employ calcined silica-based or silica-containing catalysts, for instance containing a major proportion, at least about 50 percent, of silica and minor amounts of solid acidic oxides. A silica-based catalyst can be an aromatic alkylation catalyst and include solid metal oxide or mixed solid oxides of metals or non-metals.

Silica-alumina catalysts represent the preferred class of catalysts because of their low cost, regenerability, high rate of conversion obtained, and their stability at the operating conditions employed. The synthetic gel-type silica-alumina catalyst, such as coprecipitated silica-alumina and alumina precipitated on silica, is preferred. Popular synthetic gel cracking catalysts generally contain about 10 to 30% alumina for instance, 12% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material, e.g. as may be made by precipitation of silica-alumina on an activated clay. One example of such catalysts contains about equal amounts of silica-alumina gel and clay.

The production of synthetic catalysts can be performed, for instance, (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by the combination of hydrated silica with other hydrate bases as, for instance, magnesia, zirconia, etc. These synthetic gel type catalysts are activated or calcined before use, for instance by charging to the catalyst regenerator.

When following the above catalyst preparation procedures, for instance (1), after impregnation, the resulting impregnated product is dried generally at a temperature within the range of about 170° F. to 400° F. for at least about 6 hours and up to 24 hours or more with a slow stream of air circulated to carry off the water vapor. The dried alumina catalyst mixture then may be formed by a tabletting or extruding operation. In the case of tabletting it is customary to incorporate a die lubricant which advantageously is organic and can be burned out by oxidation in the calcination step.

The catalyst pellets or particles so obtained are suitable for subjection to high temperature treatment or calcination at a temperature between about 500° F. and about 1400° F., usually about 700° F. and 1000° F. It is generally preferred that the calcining operation when containing $Al_2O_3$, be conducted to minimize contact time of the alumina-containing product with water vapor at the high temperatures encountered. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen followed by heat treatment in an atmosphere of hydrogen. As mentioned, the calcination may occur in the catalyst regenerator.

The catalyst employed in the process of the present invention can be easily regenerated employing conventional procedures, for instance by subjecting it to an oxygen-containing gas, e.g. air, at temperatures sufficient to burn off carbon deposited on the catalyst during the alkylation and transalkylation-isomerization reactions. The oxygen-containing gas is preferably introduced at a flow rate such that the maximum temperature at the site of combustion is below about 1100° F.

The following examples will serve to illustrate the present invention but they are not to be considered limiting.

EXAMPLE I

An ortho-xylene and methanol feed mixture, is heated to 600° F. and is fed to a moving bed alkylation reactor. The catalyst, Socony "Durabead," a silica-alumina catalyst (12% $Al_2O_3$), heated to 600° F., drops from a separator-surge into the reactor, from the reactor into a regenerator where coke is burned off in the presence of air, then into a lift pot where high velocity air blows it back up to the separator-surge. Reactor conditions are as follows:

| | |
|---|---|
| Temperature ° F | 600 |
| Pressure | Atmospheric |
| WHSV | 1 |
| Xylene/methanol mole ratio | 2:1 |
| Catalyst holding time, hr. | 0.1 |

The alkylation reactor effluent is cooled to 100° F. and flashed in a flash drum to remove light gases containing large amounts of methanol and dimethyl ether. A liquid water phase is also removed from the bottom of the flash drum. The liquid hydrocarbon phase from the flash drum is sent to the first tower of a two-tower heart cut fractionation system. The bottoms stream from the first tower containing aromatics boiling higher than trimethyl benzene is sent to the second fractionation tower. The overhead from the first tower comprises aromatics boiling lower than tetramethyl benzenes, primarily $C_8$ and $C_9$ methyl-benzenes, is split and approximately 85% is returned to the alkylation reactor. The remaining portion is sent to a transalkylation-isomerization reaction. The overhead from the second tower, an essentially tetramethylbenzene fraction rich in durene, is fed to a crystallization unit where high purity durene is recovered. The bottoms stream from the second tower, essentially $C_{11}$ and $C_{12}$ methylbenzenes, is sent to a transalkylation-isomerization reactor. The durene mother liquor from the crystallization unit is recycled to the alkylation reactor.

The transalkylation-isomerization reactor contains a moving bed of Socony "Durabead," a silica-alumina catalyst, 12% $Al_2O_3$. As in the alkylation reactor, the catalyst, heated to 600° F., is dropped from a separator surge into the reactor, removed from the reactor and sent to a catalyst regenerator, and after regeneration carried by an air lift into a separator surge. The condition in the transalkylation-isomerization reactor is as follows:

| | |
|---|---|
| Temperature ° F | 600 |
| Pressure | Atmospheric |
| WHSV | 1 |
| Catalyst holding time, hr. | 0.1 |

The effluent from the transalkylation-isomerization reactor is recycled to the first tower of the two-tower fractionation system.

EXAMPLE II

To demonstrate the advantageous results obtained by use of the alkylation temperatures of the invention o-xylene and an isodurene concentrate were alkylated both at 800° F. and 600° F. in accordance with the general procedure described in Example I. All runs were carried out at a weight hourly space velocity (WHSV) of 1, a catalyst holding time of 0.1 hour and a hydrocarbon/ methanol molar ratio of 5. The results are shown in Table I below:

TABLE I.—METHYLATION OF AROMATICS

| Run No | 1289-58 | 1358-16 | 1358-20 | 1358-38 |
|---|---|---|---|---|
| Feedstock | o-Xylene | Isodurene Conc. | o-Xylene | Isodurene Conc. |
| Reaction Temperature, °F | 800 | 800 | 600 | 600 |
| Products, Wt. Percent: | | | | |
| HC | 94.1 | 95.7 | 95.3 | 94.0 |
| H$_2$O | 2.7 | 1.2 | 2.9 | 2.2 |
| Coke | 0.4 | 1.9 | 0.9 | 1.6 |
| Gas ft. 3/hr | 0.040 | 0.132 | 0.066 | 0.084 |
| Analysis H$_2$O Layer: | | | | |
| H$_2$O | 99.7 | 100 | 90.4 | 99.3 |
| MeOH | 0.3 | | 9.6 | 0.7 |
| Analysis H'C Layer: | | | | |
| Dimethyl ether | | 0.1 | | |
| MeOH | 0.1 | 0.2 | | |
| C$_5$— | 0.1 | 0.2 | 0.2 | 0.1 |
| Benzene | 0.2 | | 0.1 | |
| Toluene | 6.0 | 0.1 | 1.3 | |
| m&p-Xylene | 31.5 | 1.3 | 4.5 | 0.5 |
| o-Xylene | 39.0 | 0.4 | 80.0 | 0.2 |
| Ethyltoluene | 0.1 | | | |
| 1,3,5 trimethylbenzene (TMB) | 5.0 | 4.6 | 0.8 | 3.5 |
| 1,2,4-TMB | 12.7 | 12.6 | 7.7 | 8.1 |
| 1,2,3-TMB | 2.0 | 1.5 | 2.8 | 1.1 |
| Ethylxylene | 0.2 | 0.1 | 0.1 | 0.2 |
| Durene | 1.1 | 21.0 | 0.8 | 20.3 |
| Isodurene | 1.5 | 28.3 | 1.1 | 31.1 |
| Prehnitene | 0.4 | 6.4 | 0.3 | 5.1 |
| C$_{10}$+ | | 0.2 | | 0.3 |
| Pentamethyl | 0.2 | 21.4 | 0.3 | 27.1 |
| C$_{11}$+ | | 0.2 | | 0.3 |
| Hexamethyl | | 1.4 | | 2.1 |
| C# | 8.159 | 9.966 | 8.127 | 10.13 |
| Apparent Utilization of Methanol, percent | 80 | 0 | 63.7 | 65 |

The data of Table I show that in the alkylation of C$_{10}$ aromatics as opposed to lower methylbenzenes such as xylene, care should be taken to contain side reactions, such as the "paring" reaction and hydrogenolysis, as well as methanol degradation to coke. As shown, when xylene was used as the aromatic feed better methanol utilization was obtained at a temperature of 800° F. than at 600° F. However, when an isodurene concentrate was used as the feed no apparent methanol utilization was noted at 800° F. but a methanol utilization similar to that obtained with xylene feed was noted at 600° F. Thus, the data illustrate that in the embodiment of the invention wherein isodurene is recycled to the alkylation, i.e. when the alkylation is conducted in the presence of C$_{10}$ aromatics, it is advisable to employ an alkylation temperature of no more than about 700° F.

EXAMPLE III

This example is included to show the advantages obtained by use of the transalkylation-isomerization temperatures of the invention. A C$_{10}$ aromatic fraction identified in Table II below was contacted with a moving bed of the silica-alumina catalyst of Example I at 800° F. and in a separate run at 600° F. The other conditions for each run were: weight hourly space velocity (WHSV) 1; catalyst holding time 0.1 hr.; and a catalyst/oil weight ratio of 10. The results are shown in Table II.

TABLE II.—AROMATIC DISPROPORTIONATION

| Run No | 1333-63 | 1289-92 | 1358-22 | 1333-38 | 135-23 |
|---|---|---|---|---|---|
| Feedstock | C$_9$—C$_{11}$[a] | C$_{10}$[b] | C$_9$—C$_{11}$[c] | C$_{10}$[b] | C$_8$,C$_9$,C$_{12}$, C$_{12}$[d] |
| Reaction Temp., °F | 800 | 800 | 600 | 600 | 600 |
| Products Wt. Percent: | | | | | |
| H'C | 69.9 | 98.0 | 96.2 | 98.7 | 96.5 |
| Coke | 2.0 | 1.8 | 1.6 | | 1.3 |
| Gas, ft. 3/hr | 0.080 | 0.048 | 0.048 | 0.028 | 0.066 |
| Analysis: | | | | | |
| C$_5$— | 0.5 | 0.2 | 0.2 | 0.1 | 0.2 |
| Benzene | | T | | | |
| Toluene | 0.1 | 0.1 | T | T | T |
| m&p-xylene | 2.3 | 1.7 | 1.2 | 1.0 | 1.2 |
| o-xylene | 0.7 | 0.8 | 0.4 | 0.3 | 0.8 |
| Ethyltoluene | | | | T | |
| 1,3,5-TMB | 6.5 | 5.8 | 4.8 | 5.0 | 3.4 |
| 1,2,4-TMB | 17.1 | 15.6 | 12.9 | 11.8 | 14.2 |
| 1,2,3-TMB | 2.2 | 2.2 | 1.4 | 1.8 | 1.4 |
| Ethylxylenes | 0.1 | 0.1 | 0.1 | 0.2 | T |
| Durene | 19.1 | 20.9 | 23.0 | 22.0 | 22.6 |
| Isodurene | 25.7 | 27.7 | 27.3 | 31.5 | 25.8 |
| Prehnitene | 5.7 | 6.4 | 5.5 | 5.5 | 5.1 |
| C$_{10}$+ | 0.1 | 0.3 | 0.3 | 0.4 | 0.2 |
| Pentamethyl | 19.3 | 17.4 | 21.7 | 19.6 | 23.0 |
| C$_{11}$+ | | | 0.2 | 0.1 | 0.2 |
| Hexamethyl | 0.6 | 0.8 | 1.0 | 0.7 | 1.3 |
| C# Product | 9.82 | 9.845 | 9.965 | 9.96 | 9.97 |
| C# Loss | 0.17 | 0.155 | 0.02 | 0.04 | 0.00 |

[a] 0.8% 1,3,5-TMB, 44.4% 1,2,4-TMB, 54.8% pentamethyl benzene by weight.
[b] 1.0% ethylene, 20.9% durene, 77.1% isodurene, 1.0% prehnitene by weight.
[c] 0.6% 1,3,5-TMB, 45.0% 1,2,4-TMB 54.4% pentamethyl benzene by weight.
[d] 4.5% o-xylene, 0.1% ethyltoluene, 0.6% 1,3,5-TMB, 40.2% 1,2,4-TMB, 48.3% penta methyl benzene, 6.3% hexamethyl benzene by weight.

The data of Table II show that conducting the transalkylation-isomerization at a temperature of 800° F. results in large carbon number loss compared to the carbon number loss found when a lower temperature of 600° F. is used.

It is claimed:

1. A process for the production of durene which consists essentially of contacting an aromatic hydrocarbon feed consisting essentially of methylbenzene having 2 to 3 methyl substituents and a condensation methylating agent with a moving bed of acidic, silica-based alkylation catalyst under methylation conditions including a temperature of about 550 to 850° F., fractionating the resulting methylate effluent to obtain a $C_{10}$ average methylated benzene hydrocarbon fraction and methylated benzene hydrocarbon fractions having lesser and greater carbon atoms than said $C_{10}$ fraction, returning about 70% to 99% by weight of the methylated benzene fraction of lesser carbon atoms, to said methylation reaction, separating durene from said $C_{10}$ average fraction by crystallization, contacting about 1 to 30% by weight of the methylbenzenes of lesser carbon content than said $C_{10}$ fraction and the methylbenzenes of greater carbon atoms than said $C_{10}$ fraction, to provide a methylbenzene feedstock of about 9.5 to 10.5 average carbon atoms, with a moving bed of acidic, silica-based catalyst under transalkylation-isomerization conditions including a temperature of about 550 to 700° F., treating the effluent from said latter contacting for additional durene recovery by passing it to said fractionation-crystallization system handling the methylation effluent.

2. The process of claim 1 wherein the mother liquor from the crystallization is sent to the methylation reaction and the methylation temperature is about 600 to 800.

3. The process of claim 1 wherein the mother liquor from the crystallization is sent to the transalkylation-isomerization reaction.

4. The process of claim 1 wherein the catalyst in both the alkylation and transalkylation-isomerization reactions is silica-alumina.

5. A process for the production of durene which consists essentially of contacting xylene and a condensation methylating agent with a moving bed of acidic, silica-based alkylation catalyst under methylation conditions including a temperature of about 600 to 800° F., fractionating the resulting methylate effluent to obtain a tetramethylbenzene fraction and methylbenzenes having lesser and greater carbon atoms than said tetramethylbenzene fraction, returning about 70% to 99% of the methylbenzene fraction of lesser carbon atoms to said methylation reaction, separating durene from said tetramethylbenzenes by crystallization, contacting about 1 to 30% by weight of the methylbenzenes of lesser carbon content than the tetramethylbenzene fraction and the methylbenzenes of greater carbon content than the tetramethylbenzene fraction, to provide a methylbenzene feedstock of about 9.5 to 10.5 average carbon atoms, with a moving bed of acidic, silica-based catalyst under transalkylation-isomerization conditions including a temperature of about 550 to 700° F., treating the effluent from said latter contacting for additional durene recovery by passing it to said fractionation-crystallization system handling the methylation effluent.

6. The process of claim 5 wherein the durene mother liquor from the crystallization is sent to the methylation reaction.

7. The process of claim 5 wherein the durene mother liquor from the crystallization is sent to the transalkylation-isomerization reaction.

8. The process of claim 5 wherein the catalyst in both the alkylation and transalkylation-isomerization reaction is silica-alumina.

References Cited

UNITED STATES PATENTS 3,116,340   12/1963   Burk et al. _____ 260—672 X

DELBERT E. GANTZ, *Primary Examiner.*

C. R. DAVIS, *Assistant Examiner.*